United States Patent
Feiler

(10) Patent No.: US 7,633,174 B1
(45) Date of Patent: Dec. 15, 2009

(54) FLOATING WATER TURBINE FOR A POWER PLANT

(76) Inventor: Fred John Feiler, 42 Hudson St., Oneonta, NY (US) 13820

( * ) Notice: Subject to any disclaimer, the term of this patent is extended or adjusted under 35 U.S.C. 154(b) by 291 days.

(21) Appl. No.: 11/711,325

(22) Filed: Feb. 27, 2007

(51) Int. Cl.
- F03B 13/12 (2006.01)
- H02P 9/04 (2006.01)
- F03B 13/10 (2006.01)

(52) U.S. Cl. .......................... 290/43; 290/54
(58) Field of Classification Search .................. 290/42, 290/43, 54; 60/495, 496, 498, 501, 505, 60/497; 415/7; 416/7
See application file for complete search history.

(56) References Cited

U.S. PATENT DOCUMENTS

| | | | |
|---|---|---|---|
| 565,022 A * | 8/1896 | Newburg ........................ 415/7 |
| 707,857 A * | 8/1902 | Margurb ........................ 416/85 |
| 891,671 A * | 6/1908 | Coon ............................. 415/7 |
| 932,446 A * | 8/1909 | Combs .......................... 417/334 |
| 1,025,929 A | 5/1912 | Snook |
| 3,233,574 A * | 2/1966 | Justinien ....................... 416/84 |
| 3,904,323 A * | 9/1975 | Martin et al. ................. 417/334 |
| 3,986,787 A | 10/1976 | Mouton, Jr. et al. |
| 4,081,962 A * | 4/1978 | Liu et al. ....................... 60/501 |
| 4,186,312 A * | 1/1980 | Dvorak ........................ 290/4 R |
| 4,224,793 A * | 9/1980 | Gutsfeld ........................ 60/398 |
| 4,412,417 A * | 11/1983 | Dementhon .................. 60/497 |
| 4,708,592 A | 11/1987 | Krolick et al. |
| 4,717,832 A * | 1/1988 | Harris .......................... 290/43 |
| 4,722,665 A | 2/1988 | Tyson |
| 4,816,697 A * | 3/1989 | Nalbandyan et al. .......... 290/54 |
| 4,849,647 A | 7/1989 | McKenzie |
| 5,946,909 A | 9/1999 | Szpur |
| 6,036,443 A | 3/2000 | Gorlov |
| 6,877,968 B2 | 4/2005 | Godsall et al. |
| 2002/0078687 A1* | 6/2002 | Donnelly ...................... 60/495 |

FOREIGN PATENT DOCUMENTS

JP 59215969 A * 12/1984

* cited by examiner

*Primary Examiner*—Julio Gonzalez
(74) *Attorney, Agent, or Firm*—Mark Levy; Hinman, Howard & Kattell

(57) ABSTRACT

An auger-type floating turbine having an elongated, buoyant rotating housing with one or more flights of blades, fins, or impellers supported on its outer surface is connected to an electrical generator to produce electrical power. The turbine may also be coupled to another machine such as a pump, compressor, etc. The turbine captures energy from a flowing stream of water. The rotor shaft is connected through a series of linkages to the electric generator that converts the mechanical energy into electric power. The force of water flowing causes the shaft to rotate, thus driving the linkages. Between the rotor shaft and the linkages to the generator are disposed drive shaft mechanisms and a shielding device. The mechanisms may include a shaft outlet connector, a shield connector, a thrust bearing and break, eyelets for hoist and pier connections, and a rear hoist eyelet.

6 Claims, 6 Drawing Sheets

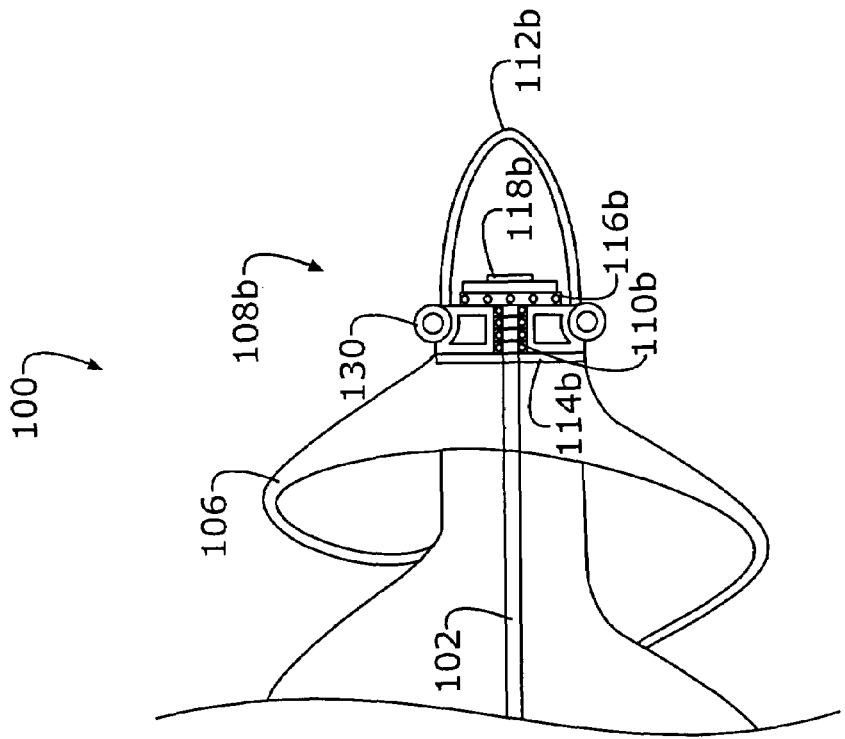
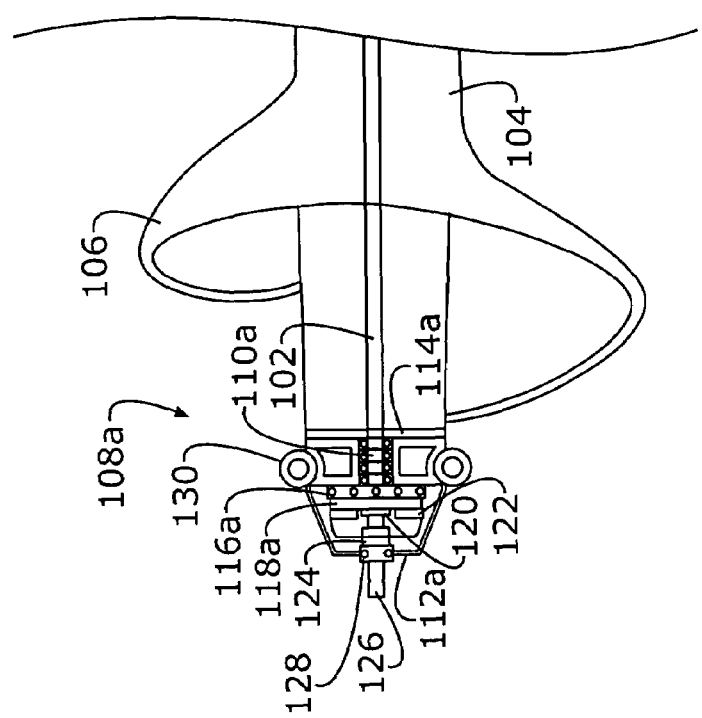
Figure 2a
Figure 2b

FLOATING WATER TURBINE FOR A POWER PLANT

FIELD OF INVENTION

This invention relates to electrical generation systems and, more particularly, to a floating hydroelectric power generation system for deployment in flowing water.

BACKGROUND OF INVENTION

With the increasing need for electrical power production and the decreasing availability of fossil fuels, alternative sources of energy must be developed. Fossil fuels currently make up over 65% of the fuels used to produce electricity in the United States. Not only are fossil fuels being consumed at an increasing rate, their use typically generates undesirable side effects: pollution. Due to this country's vast supply of flowing water, it is logical to develop systems that can harness the potential power "locked" within these flowing water resources. With the abundance of flowing water in many regions of the United States, power generated by harnessing the energy of flowing waterpower can help alleviate power distribution problems by bringing cogeneration closer to consumers of electrical power.

Auger-shaped turbines for converting the natural energy of moving bodies of water (rivers, waterfalls, channels, and the like) are known to exist. Such systems transfer rotary motion of the turbine to an electrical generator for converting energy from the flowing stream into electrical power. Auger-type turbines are used for harnessing the natural energy of either single or bi-directional river flows. In certain situations where submerged impeller type generator systems are not feasible, floating devices may be used to harness the energy of the flowing water.

U.S. Pat. No. 4,849,647 for FLOATING WATER TURBINE, issued Jul. 18, 1989 to T. Curtis McKenzie discloses floating wave turbines comprising four cylinders each containing blades or "flights" helically attached to a long drive shaft designed to harness the motion of the water flow in a bi-directional manner. This turbine is anchored to a fixed location and transfers its mechanical motion using a flexible drive cable. Buoyancy is derived from the turbine's material properties.

U.S. Pat. No. 4,717,832 for TIDAL AND RIVER TURBINE, issued Jan. 5, 1988 to Charles W. Harris discloses a plurality of parallel, axial flow auger type impellers mounted in a horizontal plane beneath a floating, inverted, dry dock type vessel. The inverted dry dock also contains deflectors that allow for bi-directional control of the water flow as it moves over the impellers. Harris does not teach concavity of the impeller blades or buoyancy of the impellers themselves.

U.S. Pat. No. 4,722,665 for TURBINE, issued Feb. 2, 1989 to Warren N. Tyson discloses an underwater turbine having a series of spaced blades attached to and extending around the periphery of a conical body.

U.S. Pat. No. 3,986,787 for RIVER TURBINE, issued Oct. 19, 1976 to William J. Mouton, Jr., et al. discloses fan-type turbines mounted beneath a floating platform.

Similar United States patents that disclose hydroelectric turbine devices include: U.S. Pat. No. 1,025,929 to H. J. Snook, May 7, 1912; U.S. Pat. No. 6,877,968 to Terrence Gordon Godsall et al, Apr. 12, 2005; U.S. Pat. No. 6,036,443 to Alexander M. Gorlov, Mar. 14, 2000; U.S. Pat. No. 4,708,592 to Robert S. Krolick et al, Nov. 24, 1987; and U.S. Pat. No. 5,946,909 to Roman Szpur, Sep. 7, 1999.

None of these patents individually, or in any combination disclose or suggest the novel floating turbine of the present invention.

A need exists for a system that continuously generates electricity from the natural energy found within flowing river water.

SUMMARY OF INVENTION

In accordance with the present invention, there is provided an auger-type floating turbine having an elongated, buoyant, rotating housing having one or more flights of blades, fins, or impellers supported on its outer surface. The turbine may be connected to an electrical generator to produce electrical power. In other applications, the floating turbine may be coupled to another machine such as a pump, compressor, etc. The inventive turbine captures energy from a flowing stream of water by harnessing the energy contained therein.

The rotating portion of the turbine is connected through a series of linkages to an electric generator that converts the mechanical energy into electric power. The force of flowing water causes the turbine to rotate, thus driving the linkages. Between the rotor and the linkages to the generator are disposed the necessary drive shaft mechanisms and a shielding device. The mechanisms, connected to the rotor end may include a shaft outlet connector, a clutch, a brake, a thrust bearing, a turntable bearing, eyelets for hoist and pier connections.

In an alternate embodiment of the inventive turbine, an internal electrical generator is provided to generate electrical energy from the energy captured by the turbine.

BRIEF DESCRIPTION OF THE DRAWINGS

A complete understanding of the present invention may be obtained by reference to the accompanying drawings, when considered in conjunction with the subsequent, detailed description, in which:

FIGS. 2a and 2b are detailed, side elevational, cross-sectional views of the proximate and distal ends, respectively, of the turbine of FIG. 1;

For purposes of clarity and brevity, like elements and components will bear the same designations and symbols throughout the FIGURES.

DESCRIPTION OF THE PREFERRED EMBODIMENT

The rotating portion of the turbine is connected through a series of linkages to an electric generator that converts the mechanical energy into electric power. The force of flowing water causes the turbine to rotate, thus driving the linkages. Between the rotor and the linkages to the generator are disposed the necessary drive shaft mechanisms and a shielding device. The mechanisms connected to the rotor end may include a shaft outlet connector, a clutch, a brake, a thrust bearing, a turntable bearing, eyelets for hoist and pier connections.

Figure 1:
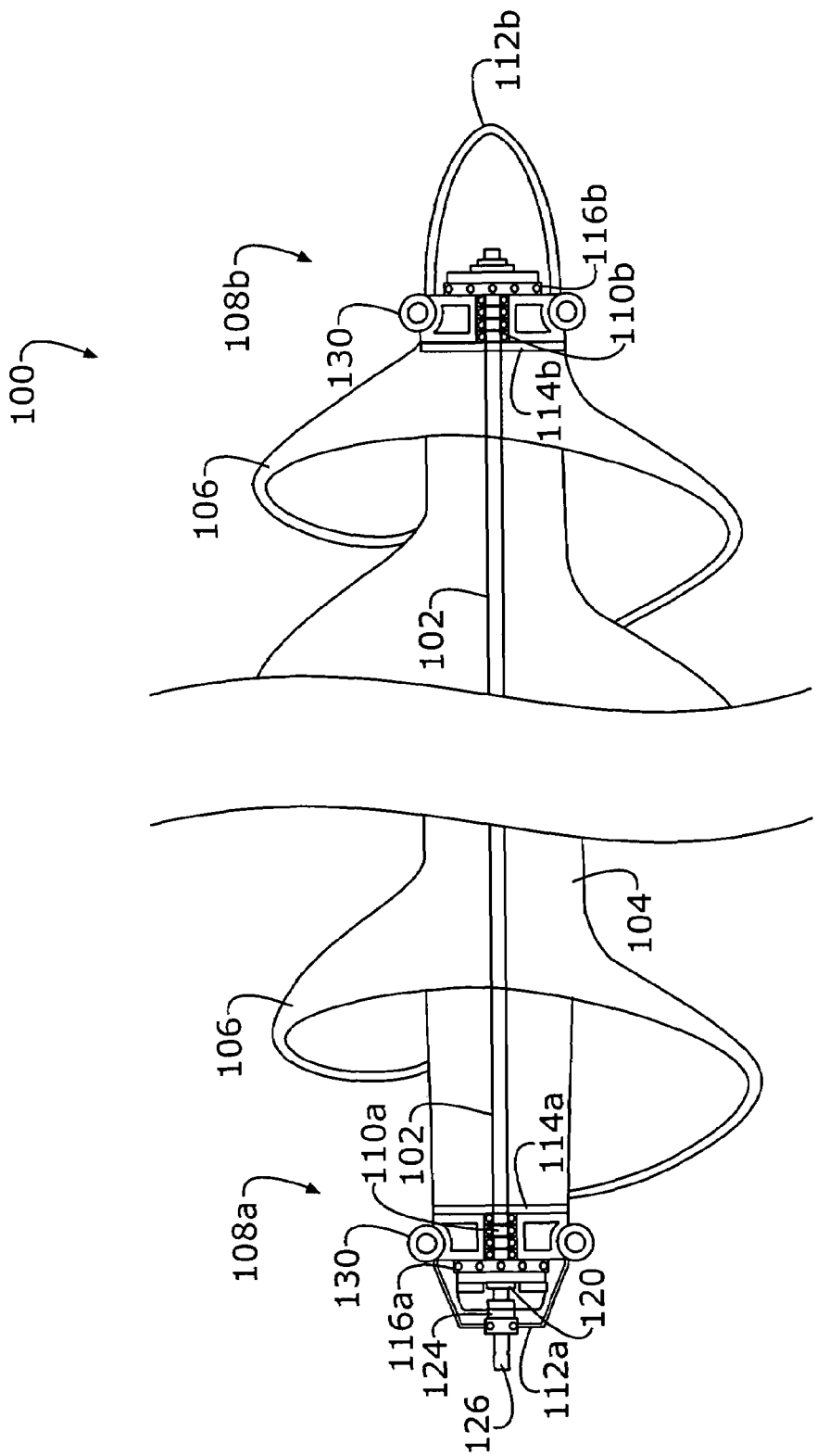
FIG. 1 is a quasi-perspective view of the turbine of the invention including detailed, side elevational, cross-sectional views of the end regions thereof.

Referring first to FIG. 1, there is shown a quasi-perspective view of the turbine of the invention, including side elevational, cross-sectional views of the end regions thereof, generally at reference number 100.

Turbine 100 has a central shaft 102 disposed longitudinally in an elongated, buoyant housing 104 that is affixed thereto and rotative therewith. Elongated buoyant housing 104 and shaft 102 are designed to have a combined weight less than the weight of the volume of water displaced thereby. In the embodiment chosen for purposes of disclosure, a combined weight of less than one half the weight of the water displaced thereby has been chosen. It will be recognized that other predetermined ratios of weight vs. weight-of-displaced-water could be chosen to meet a particular operating circumstance or environment. Consequently, the invention comprehends any weight vs. weight-of-displaced-water ratio. Elongated buoyant housing 104 and/or blades 106 may, therefore, be made from plastic, wood, expanded polymer foam, metal or any other material that satisfies this buoyancy requirement. However, the selected material must withstand impingement by debris floating in the stream in which turbine 100 is placed. Consequently, an impact resistant material is desirable. It will also be recognized that the components identified as buoyant housing 104 and blades 106 may be a unified structure.

Disposed on an outer surface of elongated, buoyant housing 104 are one or more flights of helical fins, blades, or impellers (i.e., blades) 106. The exact shape, pitch, number or flights, or other characteristics of fins 106 are selected to optimize the energy capture from water moving against them. In the embodiment chosen for purposes of disclosure, the shape of the turbine blades 106 may be modeled by a plurality of crescent-shaped segments arrayed helically around a cylindrical cores, the segments being disposed at an angle of between approximately 30° and 60° to the major axis of the cylindrical core. Such helical blades 106 are believed to be known to those of skill in the art and are not further described herein. In the embodiment chosen for purposes of disclosure, concave impellers 106 have been chosen. However, it will be recognized that other shapes and styles of fins, blades, or impellers 106 may be chosen. As will be recognized by those of skill in the hydraulic engineering arts, the size, shape, and arrangement of fins, blades, or impellers 106 on outer surface of elongated, buoyant housing 104 are chosen to extract the maximum amount of energy from the flowing water stream by techniques such as minimizing turbulence, channeling the flow of water through the impeller 106 along the concave side thereof, encouraging a rolling effect on the convex side of the impeller and controlling the shape of the blades 106 to optimize the performance, especially "lift" and "roll" effects, of the hydrofoil formed by blades 106.

Referring now also to FIGS. 2a and 2b, there are shown detailed, side elevational, cross-sectional views of the proximal end region 108a and the distal end region 108b, respectively of elongated, buoyant housing 104. Shaft 102 protrudes beyond buoyant housing 104 at both proximal end 108a and distal end 108b thereof and is supported by thrust bearings 110a, 110b, respectively. Thrust bearings 110a, 110b are supported in respective housing frames 112a, 112b.

Seals 114a, 114b are disposed between respective ends of elongated, buoyant housing 104 and frames 112a, 112b to exclude water from the interior regions thereof. Seals 114a, 114b are typically low friction wiping seals known to those of skill in the art. Such seals 114a, 114b allow rotation of the ends of elongated buoyant housing 104 against respective ones of frames 112a, 112b without adding a significant load to turbine 100 while maintaining watertight seals. It will be recognized that slewing rings and other such devices, not shown, of course may be used to replace seals 114a, 114b and possibly other end region components.

Turntable bearings 116a, 116b are vertically aligned and have a central opening sized to allow shaft 102 to pass therethrough unobstructed. At distal end 108b, a shaft plate 118b is affixed to the protruding end of shaft 102. Shaft plate 118b is abutted against and rides on turntable bearing 116b. A bearing cap 112b encloses and seals distal end 108b. Similarly, at the proximal end 108a, a shaft plate 118a is also affixed to the protruding end of shaft 102.

A clutch plate or rotor 120 is disposed intermediate shaft plate 118a and turntable bearing 116a and rotates with shaft 102. A clutch pressure plate 122 is disposed inline with and adjacent to, but separated from, clutch plate 120. A clutch actuating mechanism 124 selectively engages clutch pressure plate 122 with clutch disk 120, thereby coupling the rotary motion of shaft 102 to an output shaft 126 supported in a bearing 128. It will be recognized by those of skill in the art that many forms of clutch 120, 122 and clutch actuator 124 may be implemented depending upon operational requirements. Mechanical actuators operated from outside frame 112a, of course, may be used. Likewise, electrically actuated or centrifugal clutches may be used. The specific clutch forms no part of the present invention which includes any and all suitable clutch types, styles, and actuation methods.

Output shaft 126 may include splines to facilitate coupling to an in-line load such as an electrical generator, not shown. Other rotary drive mechanical devices including, but not limited to, compressors and pumps may be substituted for an electrical generator. Other power take off (PTO) mechanisms, of course, may be used in lieu of an inline arrangement.

Housing frames 112a, 112b are each equipped with external attachment rings 130 to facilitate anchoring turbine 100 in its intended operating environment. Attachment rings or eyelets 130 also facilitate hoisting and transporting turbine 100 when required.

Figure 3:
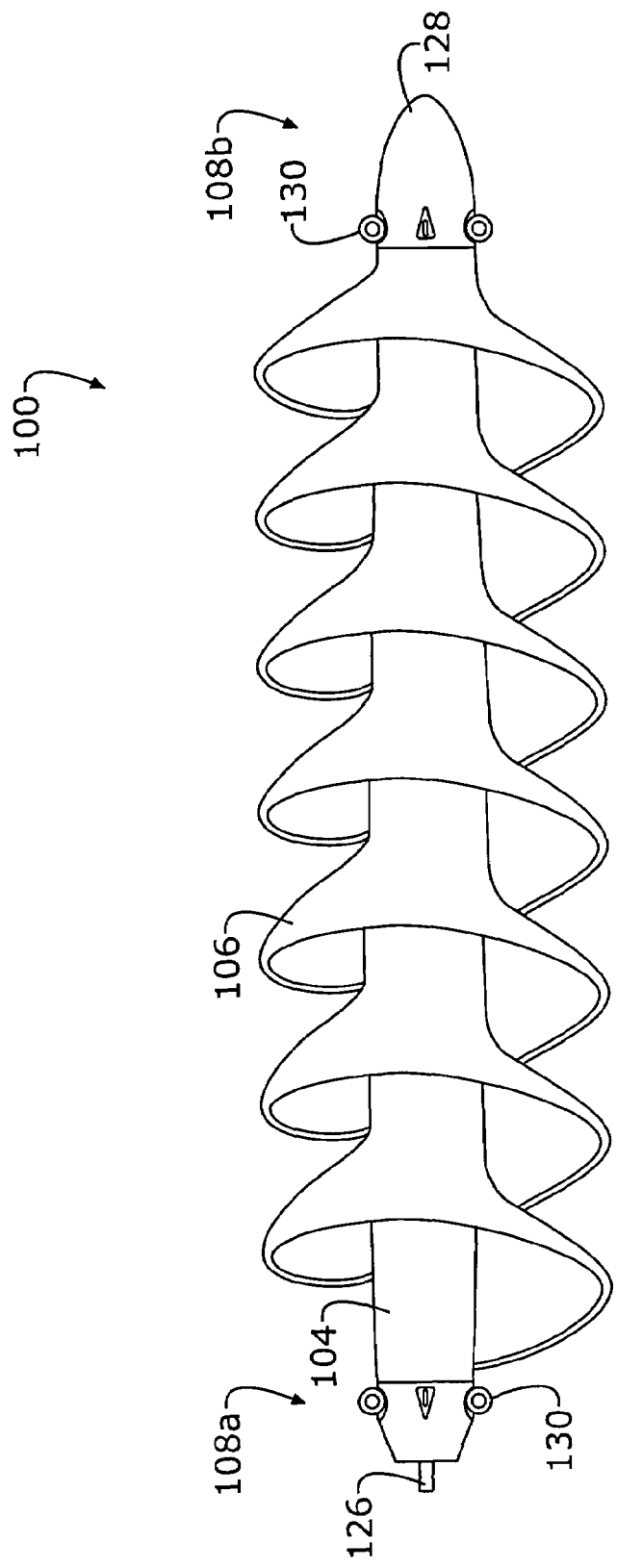
FIG. 3 is a perspective view of the turbine of FIG. 1.

Referring now to FIG. 3, there is shown a perspective view of turbine 100. In the embodiment shown in FIG. 3, a single flight of concave fins, blades, or impellers 106 is helically disposed on an outer surface of elongated, buoyant housing 104. In a preferred embodiment, elongated, buoyant housing 104 and fins or blades 106 are molded from expanded foam and covered with a durable protective coating. Many materials, for example, polyurethane are readily "foamed," "skinned," and/or molded. Such processes are believed known to those of skill in the polymer arts and are not further described herein. Either open cell or closed cell foam may be used, closed cell foam being preferable because in the event of a surface puncture, water does not easily spread throughout elongated, buoyant housing 104. As previously mentioned, many possible configurations of blades, fins, or impellers 106 are possible to meet a particular operating requirement.

Figure 4:
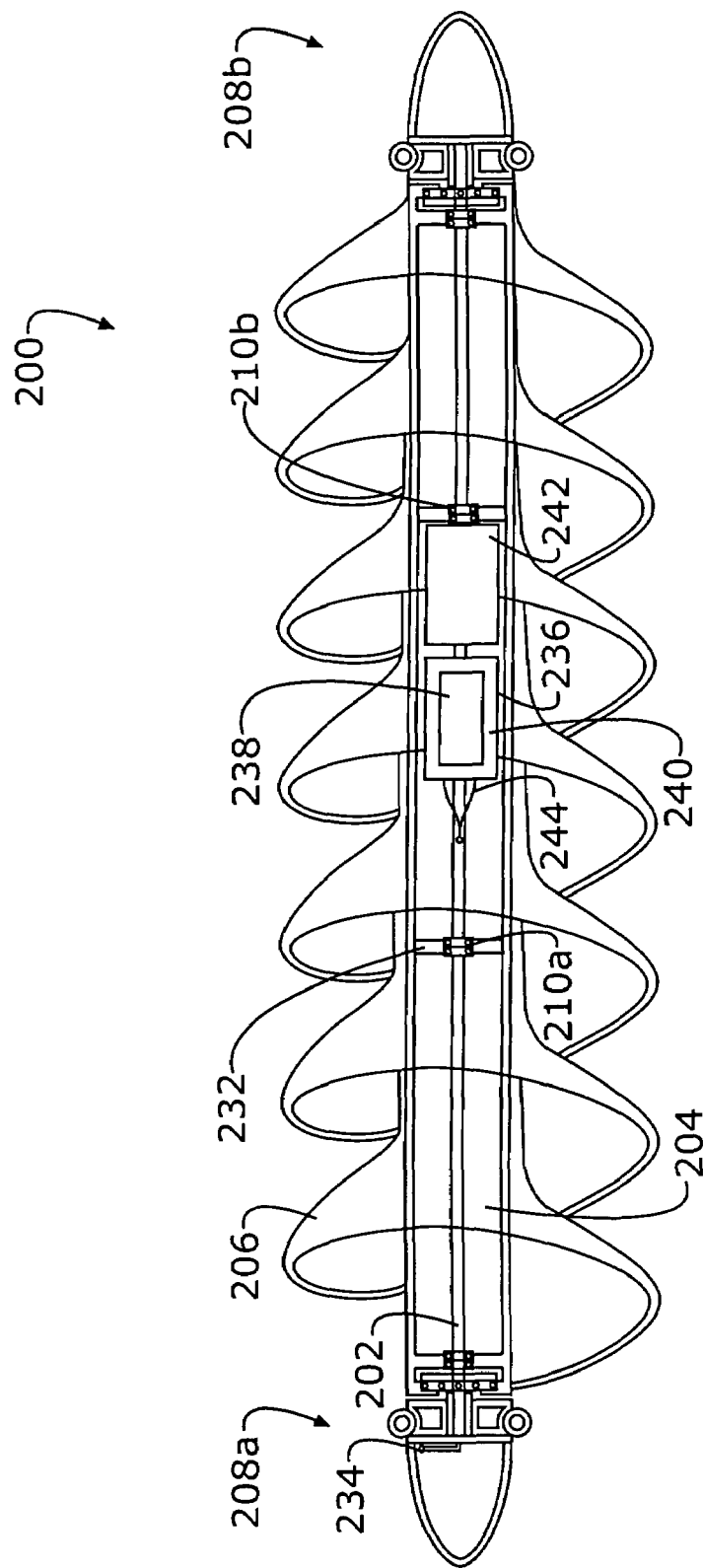
FIG. 4 is a system schematic diagram of a tethered installation of the turbine of FIG. 1 to a pier.

Referring now to FIG. 4, there is shown a side, elevational, cut-away view of an alternate embodiment of the inventive buoyant turbine of the invention, generally at reference number 200. Turbine 200 is different from turbine 100 (FIG. 1) in one very important way. In turbine 100, an internal shaft 102 is rotated by buoyant housing 104 carrying blades 106. Shaft 102 provides rotary power for external consumption (e.g., to turn an external generator, compressor, etc.). In turbine 200, however, shaft 202 is stationary.

A series of shell wheels 232 supports shaft 202, centering shaft 202 within the interior region of buoyant housing 204. Shell wheels 232 rotate around stationary shaft 202.

An alternator or generator 236 is disposed within buoyant housing 204. Alternator 236 has a rotating portion (i.e., rotor) 238 and a stationary portion (i.e., stator) 240 formed concentrically around stationary shaft 202. Rotor 238 is operatively connected to buoyant housing 204 while stator 240 is anchored to stationary shaft 202. A construction wherein the rotor 238 consists of permanent magnets while stator 240 uses conventional, wound coils so as to preclude the need for slip rings or any other moving structure to transfer electrical current from the rotating structure 240 to electrical conductors 244.

A gearbox 242 or other similar device may be interposed between rotating buoyant housing 204 and alternator 238 to match alternator 236 (i.e., rotor 238) to the rotational speed of buoyant housing 204. Electrical conductors 244 are connected between stator 240 and external electrical connector 234. If shaft 202 is hollow, electrical conductors may be routed therethrough. It will be recognized that other routing of electrical conductors 244 is possible.

Figure 5A:
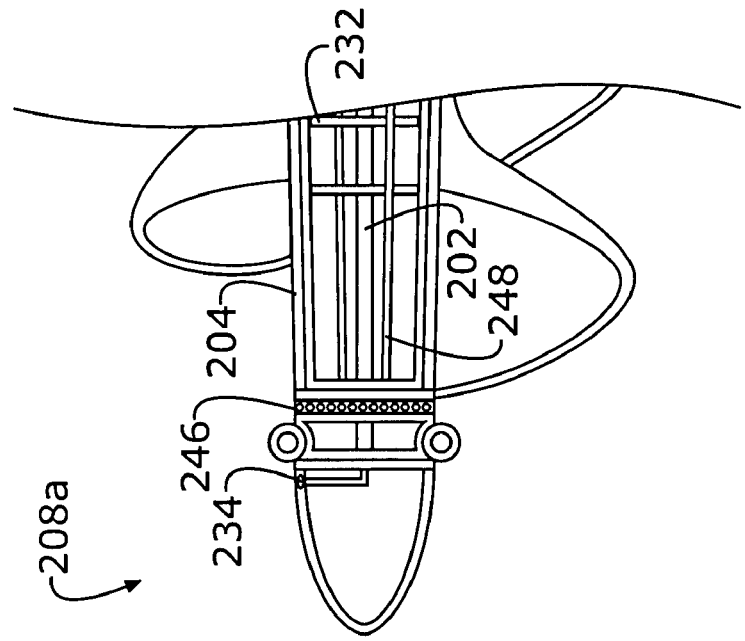
FIGS. 5a and 5b are detailed side, cross-sectional views of two embodiments of proximal end region of the turbine of FIG. 4.
Figure 5B:
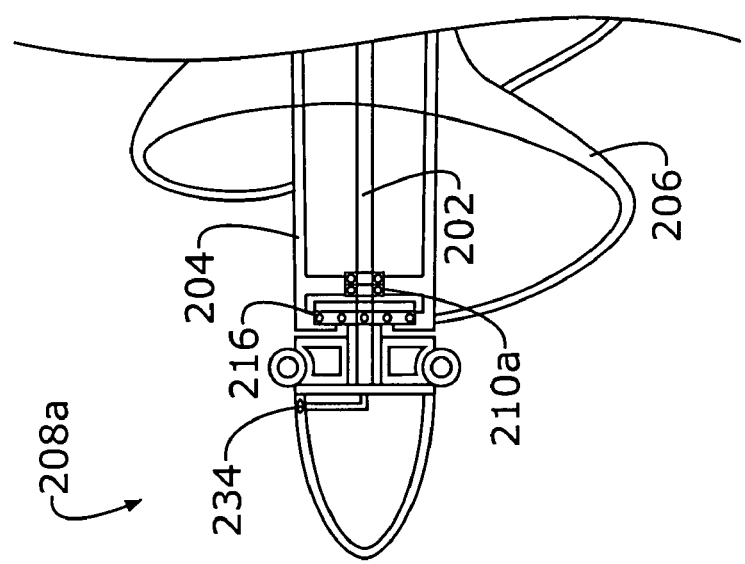

Referring now to FIGS. 5a and 5b, there are shown detailed side, cross-sectional views of two embodiments of proximal end region 208a of the inventive, fixed shaft turbine. In FIG. 5a, a traditional turntable bearing 216 and seal arrangement are used. The detailed description provided hereinabove in conjunction with FIG. 2a is generally applicable to the embodiment of FIG. 5a, with modifications to accommodate stationary shaft 202.

In the embodiment of FIG. 5b, however, a slewing ring 246 provides function associated with the seal (not specifically identified), thrust bearing 210a, and turntable bearing 216. The design of FIG. 5b uses fewer components resulting in potentially higher reliability and lower manufacturing cost. Shell wheel 232 rotates around stationary shaft 202 and centers the inner shell 248 around stationary shaft 202.

Figure 6:
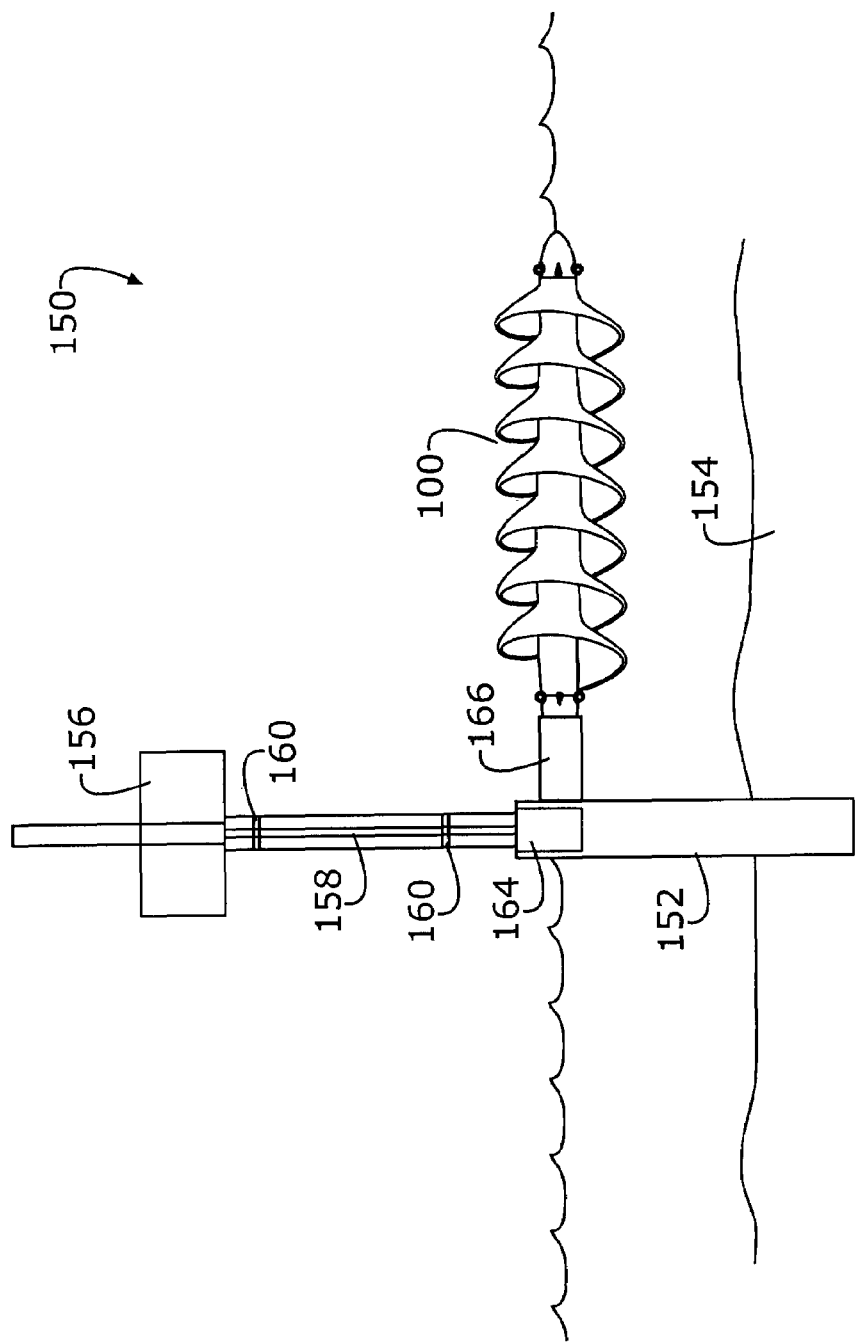
FIG. 6 is a system schematic diagram showing one possible way to tether the turbines of the invention in a flowing stream.

Turbine 100 is designed for tethered placement in a flowing stream. Referring now to FIG. 6, there is shown a system schematic diagram showing one possible way to tether turbine 100, generally at reference number 150. A hollow pier 152 is secured in the bed 154 of a river or stream using techniques known to those of skill in the art.

A generator 156 is disposed on a pier 152 at a point well above a high water mark of the stream or river. A rotary drive shaft 158 is disposed concentrically within hollow pier 152. One or more bearings 160 disposed within hollow pier 152 support and center drive shaft 158. An upper end of shaft 158 is operatively connected to generator 156. A lower end of shaft 158 is connected to an output of a right-angle drive assembly 164. An input to right-angle drive assembly 164 is connected to output shaft 126 (FIG. 2) of turbine 100. A hollow, buoyant shield 166 covers output shaft 126 or an extension thereof, not shown. Buoyant shield 166 helps keep turbine 100 aligned substantially parallel to the surface of the stream.

A vertical adjustment mechanism disposed within pier 152 is adapted to raise and lower the level of right-angle drive assembly responsive a change in the water level of the stream or river. While many mechanisms known to those of skill in the art may be used to accomplish this function, a threaded screw drive has been chosen for purposes of disclosure. This screw drive may be actuated in a variety of ways also believed known to those of skill in the art. It will be recognized that many other tethering schemes are possible.

It will be recognized that in either of the embodiments described hereinabove, additional mechanisms may be required to protect turbines 100 (FIG. 1), 200 (FIG. 4) from damage caused by excessive speed in rapidly flowing water. Brakes, governors, shear pins, or other such regulating and/or protecting devices known to those of skill in the art of course, may be added without deviating from the invention.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims:

1. A floating turbine, comprising:
  a) a rotating shaft centrally disposed within and defining a major axis of an elongated, buoyant housing having a proximal end and a distal end and being mechanically coupled to said rotating shaft, said rotating shaft protruding beyond each of said proximal and said distal ends;
  b) a plurality of blades helically disposed on an outer surface of said elongated, buoyant housing;
  c) a stationary housing frame disposed proximate each of said proximal end and said distal end of said elongated, buoyant housing, said housing frame comprising a bearing adapted to receive and rotatively support said protruding portion of said rotating shaft;
  d) means for connecting a rotating load to said protruding portion of said rotating shaft disposed at least one of said proximate end and said distal end of said elongated, buoyant housing; and
  e) said elongated, buoyant housing comprising a volume, displacing an amount of water having a predetermined relationship to a weight of said turbine.

2. The floating turbine as recited in claim 1, wherein said means for connecting a rotating load comprises an output shaft, and said turbine further comprises:
  f) means for selectively connecting said rotating shaft to said output shaft.

3. The floating turbine as recited in claim 2, wherein said means for selectively connecting said rotating shaft to said output shaft comprises a clutch disposed within said housing frame and operatively connected to said rotating shaft and to said output shaft.

4. The floating turbine as recited in claim 1, further comprising:
  f) at least one selected from the group: a thrust bearing, a turntable bearing, and a shaft plate, each disposed within said housing frame.

5. The floating turbine as recited in claim 1, wherein said volume displaces an amount of water weighing approximately 40% to 90% of said weight of said turbine.

6. The floating turbine as recited in claim 1, wherein said plurality of blades helically disposed on an outer surface of said elongated, buoyant housing have the shape of a plurality of crescent-shaped segments arrayed helically around a cylindrical core.

* * * * *